United States Patent
Ishizaki

(10) Patent No.: US 7,495,731 B2
(45) Date of Patent: Feb. 24, 2009

(54) RETARDATION ELEMENT, DISPLAY ELEMENT COMPRISING THE SAME, AND PROCESS OF PRODUCING RETARDATION ELEMENT

(75) Inventor: Koji Ishizaki, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/822,109

(22) Filed: Jul. 2, 2007

(65) Prior Publication Data

US 2007/0252929 A1 Nov. 1, 2007

Related U.S. Application Data

(62) Division of application No. 10/732,817, filed on Dec. 11, 2003, now Pat. No. 7,253,859.

(30) Foreign Application Priority Data

Dec. 13, 2002 (JP) ............................. 2002-362262

(51) Int. Cl.
*G02F 1/1335* (2006.01)
(52) U.S. Cl. .......................... 349/117; 349/119; 349/61
(58) Field of Classification Search ......... 349/117–119, 349/61
See application file for complete search history.

(56) References Cited

U.S. PATENT DOCUMENTS

| | | | | |
|---|---|---|---|---|
| 5,403,510 A | * | 4/1995 | Kajiyama et al. ...... | 252/299.01 |
| 5,750,213 A | * | 5/1998 | Onishi et al. ................. | 428/1.2 |
| 5,805,253 A | | 9/1998 | Mori et al. | |
| 5,818,615 A | * | 10/1998 | Abileah et al. .............. | 349/117 |
| 5,841,492 A | * | 11/1998 | Iwauchi et al. ................ | 349/74 |
| 5,926,241 A | * | 7/1999 | Gunning, III ............... | 349/117 |
| 6,128,056 A | * | 10/2000 | Kubota et al. ................. | 349/86 |
| 6,252,640 B1 | * | 6/2001 | Kim et al. ..................... | 349/96 |
| 6,573,959 B1 | | 6/2003 | Molsen | |
| 6,624,863 B1 | | 9/2003 | Jacobs et al. | |
| 7,068,345 B2 | * | 6/2006 | Kashima ..................... | 349/183 |
| 2002/0041352 A1 | | 4/2002 | Kuzuhara et al. | |

FOREIGN PATENT DOCUMENTS

JP      A-02-020825      1/1990

(Continued)

*Primary Examiner*—Mike Qi
(74) *Attorney, Agent, or Firm*—Oliff & Berridge, PLC

(57) ABSTRACT

The present invention provides a retardation element capable of ensuring that, even when the retardation element is incorporated into a display element having pixels, each pixel being a triad of red, green and blue display sections, the display element shows excellent display characteristics. A retardation film includes a glass substrate, and a liquid crystal layer made from a polymerizable liquid crystalline material, formed on an alignment layer that has been formed on top of the glass substrate. The retardation film is for use in a liquid crystal display element having pixels, each pixel being a triad of red, green and blue display sections, and the liquid crystal layer has a plurality of fine areas that have been created, by patterning, correspondingly to the display sections of the pixels in the three colors. These fine areas are made from one liquid crystalline material, and have different thicknesses so that they have different retardation values depending upon the wave range of light that passes through them.

11 Claims, 6 Drawing Sheets

FOREIGN PATENT DOCUMENTS

| | | | |
|---|---|---|---|
| JP | 2-282718 | * | 11/1990 |
| JP | A-03-191327 | | 8/1991 |
| JP | A-04-134322 | | 5/1992 |
| JP | 7-199173 | | 8/1995 |
| JP | 8-36172 | | 2/1996 |
| JP | A-08-029618 | | 2/1996 |
| JP | 9-54212 | | 2/1997 |
| JP | A-10-020301 | | 1/1998 |
| JP | A-2002-072446 | | 3/2002 |
| JP | A-2002-328229 | | 11/2002 |

* cited by examiner

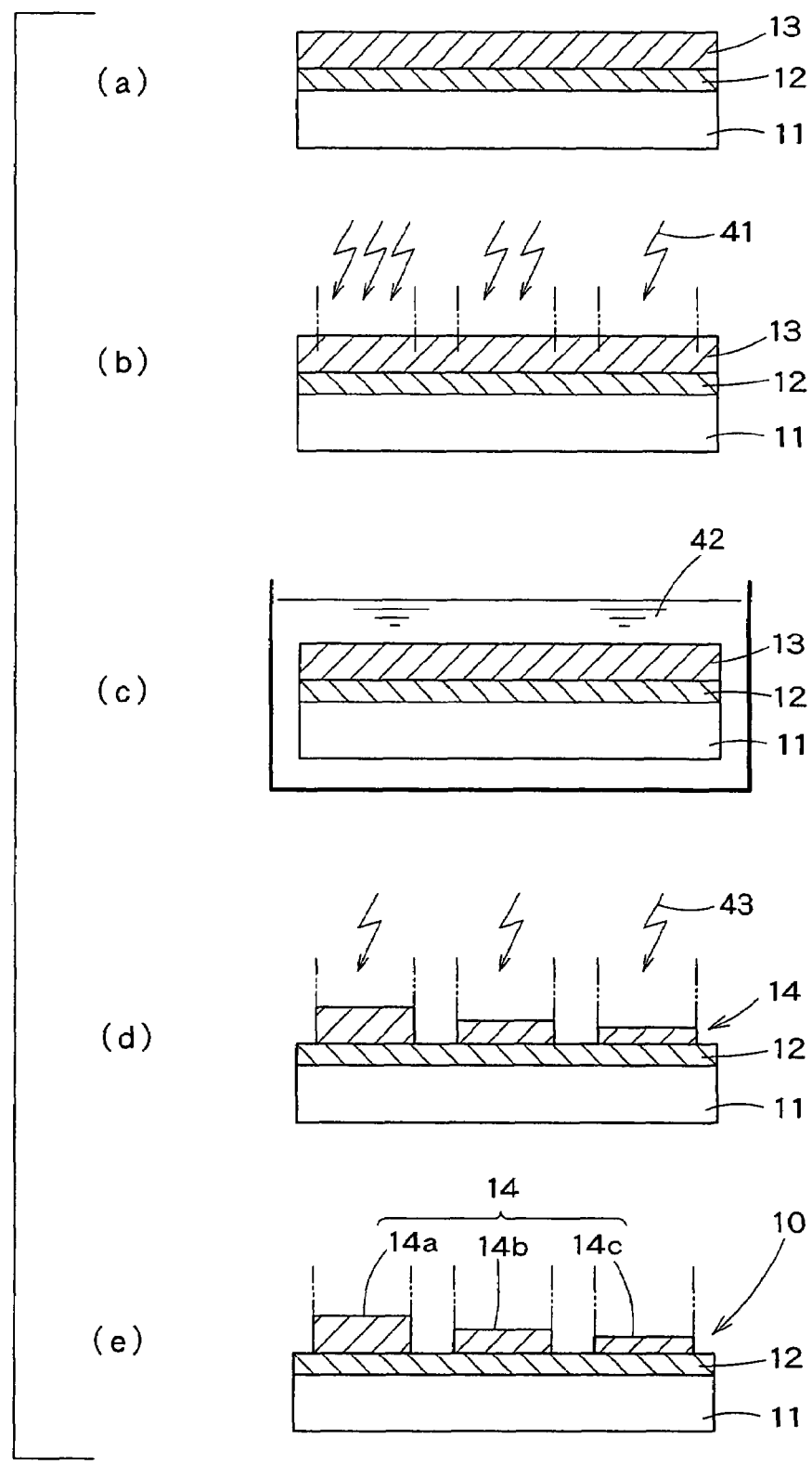
F I G. 3

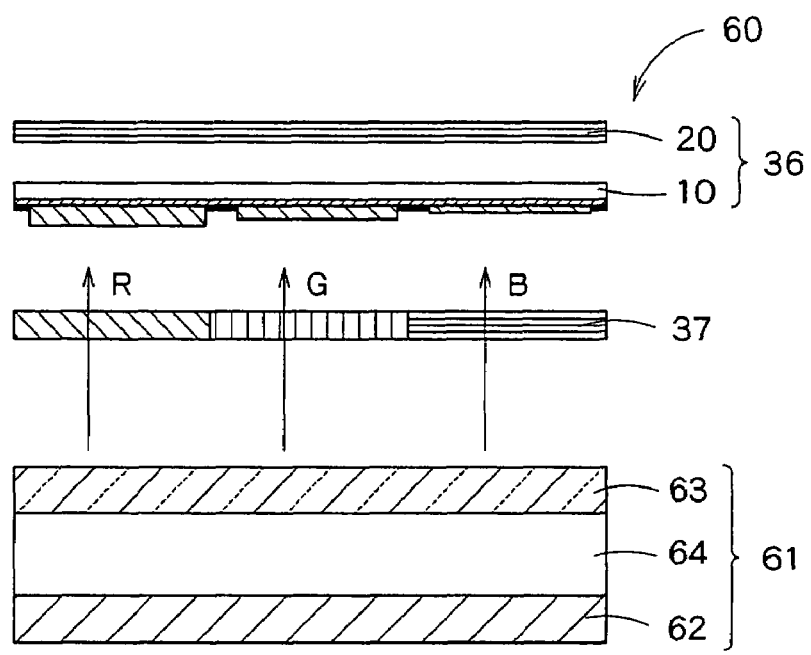
F I G. 8
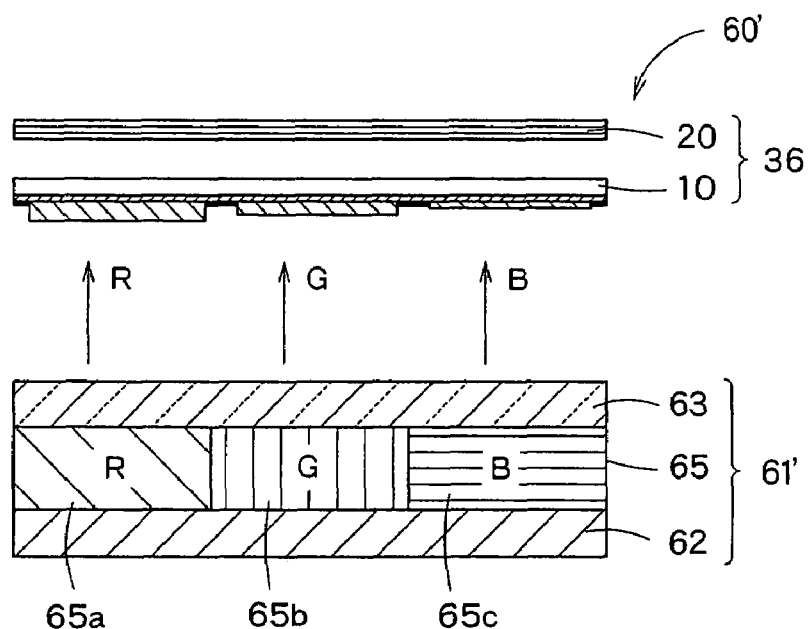
F I G. 9

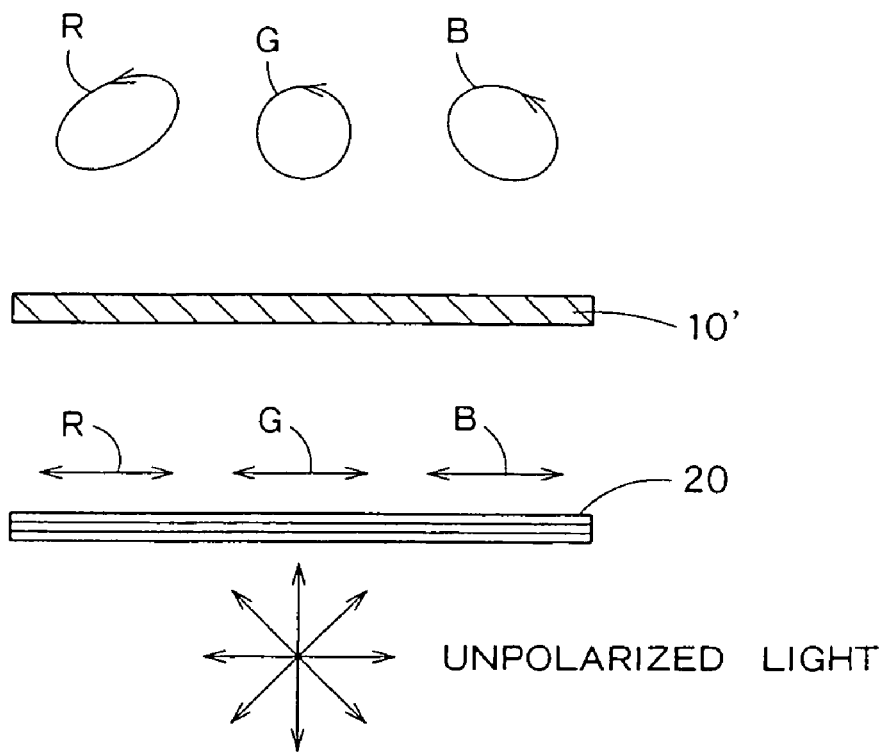
F I G. 10
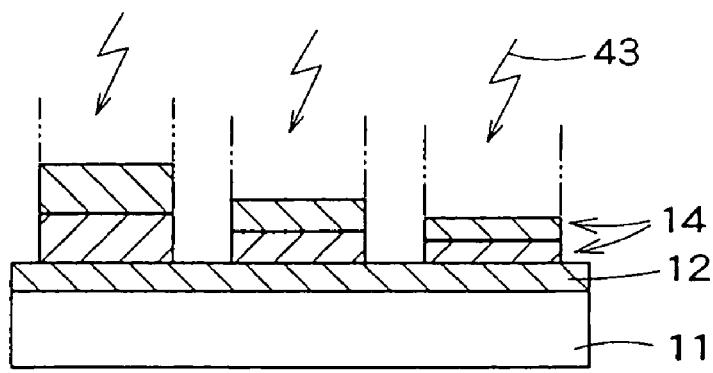
F I G. 11

RETARDATION ELEMENT, DISPLAY ELEMENT COMPRISING THE SAME, AND PROCESS OF PRODUCING RETARDATION ELEMENT

This is a Division of application Ser. No. 10/732,817 filed Dec. 11, 2003. The disclosure of the prior application is hereby incorporated by reference herein in its entirety.

BACKGROUND OF THE INVENTION

1. Field of the Invention

The present invention relates to an optical element, such as a circular polarization controlling element, for use in a display element such as a liquid crystal display element or an organic electroluminescent display element. More particularly, the present invention relates to: a retardation element comprising a liquid crystal layer made from a polymerizable liquid crystalline material; a display element comprising the retardation element; and a process of producing the retardation element.

2. Description of Related Art

Retardation films (retardation elements) comprising liquid crystal layers made from polymerizable liquid crystalline materials are known as optical elements for use in display elements such as liquid crystal display elements and organic electroluminescent display elements, and are widely used as components ($\lambda/4$ retardation films and $\lambda/2$ retardation films) of absorption circular polarizers that constitute display elements. These retardation films are also used for linear polarizers and for viewing angle compensators of a variety of liquid crystal modes.

Such a retardation film is usually prepared by stretching a polymeric film in a definite direction, and its retardation value is made uniform over the film plane. Japanese Laid-Open Patent Publication No. 54212/1997 proposes, in connection with the structure of a liquid crystal display element, a retardation film whose pixel-corresponding area and non-pixel-corresponding area have different retardation values.

The above-described conventional retardation film, however, has a retardation value that is constant in one pixel even if a display element into which the retardation film is incorporated is a color display element. Therefore, in the case where the display element is a color display element (in the case where the display element has pixels, each pixel being a triad of red, green and blue display sections), red, green and blue light that pass through the display sections of the pixels in the three colors are polarized into different states because of their wave ranges. Namely, as shown in FIG. 10, in the case where a combination of a retardation film 10' having a retardation value of $\lambda/4$ for light that is roughly in the green wave range and a linear polarizer 20 is used as a circular polarizer, unpolarized light that has entered the circular polarizer from the linear polarizer 20 side becomes linearly polarized light as it passes through the linear polarizer 20, and this linearly polarized light becomes circularly polarized light as it passes through the retardation film 10'. However, the degree to which linearly polarized light is converted into circularly polarized light by the retardation film 10' varies depending upon the wave range of the linearly polarized light, so that the state of polarization of the circularly polarized light finally obtained is inevitably varied.

SUMMARY OF THE INVENTION

The present invention has been accomplished in the light of the above-described drawback in the related art. An object of the present invention is therefore to provide: a retardation element capable of ensuring that, even when the retardation element is incorporated into a display element having pixels, each pixel being a triad of red, green and blue display sections, the display element shows excellent display characteristics; a display element comprising such a retardation element; and a process of producing the retardation element.

The first aspect of the present invention is a retardation element for use in a display element having pixels, each pixel being a triad of red, green and blue display sections. The retardation element comprises: a substrate having aligning power; and a liquid crystal layer made from a polymerizable liquid crystalline material, formed on the substrate, wherein the liquid crystal layer has a plurality of fine areas that have been created, by patterning, correspondingly to the display sections of the pixels in the three colors and that have different retardation values for red, green and blue light that pass through the fine areas.

In the above-described first aspect of the present invention, it is preferable that the liquid crystal layer comprises a nematic liquid crystalline material, a cholesteric liquid crystalline material, or a combination of one or more of these liquid crystalline materials. It is also preferable that the fine areas in the liquid crystal layer have different film thicknesses so that they have different retardation values depending upon the wave range of light that passes through them. Further, it is preferable that the fine areas in the liquid crystal layer be made from different liquid crystalline materials so that they have different retardation values depending upon the wave range of light that passes through them. Furthermore, the rising distance z at the end of each fine area in the liquid crystal layer is not more than 10 μm. Furthermore, it is preferable that the liquid crystal layer be a laminate of two or more liquid crystal layers. In addition, it is preferable that the substrate be a transparent substrate.

The second aspect of the present invention is a display element having pixels, each pixel being a triad of red, green and blue display sections. The display element comprises a light-emitting component having the function of individually controlling each display section of each pixel, which is a triad of red, green and blue display sections, to the bright or dark state; and a retardation element for use with the light-emitting component. The retardation element comprises a substrate having aligning power, and a liquid crystal layer made from a polymerizable liquid crystalline material, formed on the substrate, wherein the liquid crystal layer has a plurality of fine areas that have been created, by patterning, correspondingly to the display sections of the pixels in the three colors and that have different retardation values for red, green and blue light that pass through the fine areas.

In the above-described second aspect of the present invention, the light-emitting component comprises: a liquid crystal cell having the function of individually controlling each pixel, which is a triad of red, green and blue display sections, to the bright or dark state; and a color filter having fine patterns in three colors of red, green and blue that serve as the display sections in the three colors of red, green and blue, respectively. The above-described retardation element is preferably used together with the liquid crystal cell and the color filter.

Further, in the above-described second aspect of the present invention, the light-emitting component comprises: a white electroluminescent element having the function of individually controlling each pixel, which is a triad of red, green and blue display sections, to the bright or dark state; and a color filter having fine patterns in three colors of red, green and blue that serve as the display sections in the three colors of red, green and blue, respectively. The above-described retardation element may be used together with the white electroluminescent element and the color filter.

Furthermore, in the above-described second aspect of the present invention, the light-emitting component comprises an electroluminescent element having the function of individually controlling each pixel, which is a triad of red, green and blue display sections, to the bright or dark state, the electroluminescent element comprising red-, green- and blue-light-emitting elements that serve as the display sections in the three colors of red, green and blue, respectively. The above-described retardation element may be used together with the electroluminescent element.

The third aspect of the present invention is a process of producing a retardation element for use in a display element having pixels, each pixel being a triad of red, green and blue display sections. The process comprises the steps of: forming, on a substrate having aligning power, a liquid crystal layer by a polymerizable liquid crystalline material; curing the liquid crystal layer on the substrate by the application of first radiation, in which the quantity of the first radiation that is applied to the liquid crystal layer on the substrate is varied depending upon the group of fine areas to be created in the liquid crystal layer correspondingly to the display sections of the pixels in one of the three colors; and bringing the liquid crystal layer irradiated with the first radiation into an organic solvent.

In the above-described third aspect of the present invention, it is preferable that the first radiation be applied to the liquid crystal layer in an atmosphere of nitrogen and that the temperature of the atmosphere be higher than room temperature.

Further, in the above-described third aspect of the present invention, it is preferable that the process further comprises the step of curing, by the application of second radiation, the liquid crystal layer that has been brought into contact with the organic solvent. In this case, it is preferable that the second radiation be applied to the liquid crystal layer in an atmosphere of nitrogen and that the temperature of the atmosphere be higher than room temperature.

According to the present invention, the liquid crystal layer constituting the retardation element has fine areas that have been created, by patterning, correspondingly to the display sections of the pixels in the three colors, and these fine areas are made to have different retardation values depending upon the wave range of light that passes through them, so that light passing through the display sections of the pixels in the three colors undergoes no scatter in the state of polarization. For this reason, even when the retardation element is incorporated into a display element having pixels, each pixel being a triad of red, green and blue display sections, the display element can show excellent display characteristics.

BRIEF DESCRIPTION OF THE DRAWINGS

In the drawings,

FIG. 3 is a flow chart illustrating a process of producing the retardation element shown in FIG. 1;

FIG. 8 is a diagrammatic sectional view showing an embodiment of an organic electroluminescent display element into which the retardation element shown in FIG. 1 is incorporated;

FIG. 9 is a diagrammatic sectional view showing another embodiment of an organic electroluminescent display element into which the retardation element shown in FIG. 1 is incorporated;

FIG. 10 is a view explaining the action of a conventional retardation element; and FIG. 11 is a view showing the laminate of two or more liquid crystal layers.

DETAILED DESCRIPTION OF PREFERRED EMBODIMENTS

With reference to the accompanying drawings, embodiments of the present invention will be described hereinafter.

First of all, a retardation film (retardation element) according to an embodiment of the present invention will be described.

Figure 1:
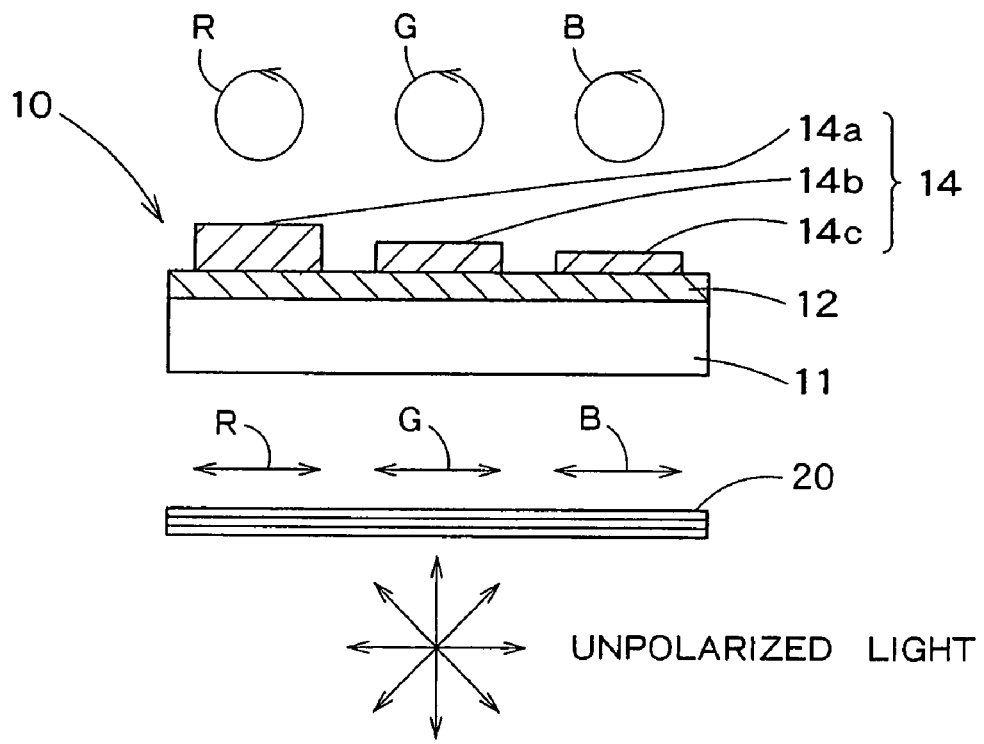
FIG. 1 is a diagrammatic sectional view showing a retardation element according to an embodiment of the present invention.

As shown in FIG. 1, a retardation film 10 according to this embodiment comprises a glass substrate 11, an alignment layer 12 formed on the glass substrate 11, and a liquid crystal layer 14 made from a polymerizable liquid crystalline material. The liquid crystal layer 14 is formed on the alignment layer 12 that has been formed on top of the glass substrate 11. The glass substrate 11 and the alignment layer 12 constitute a transparent substrate.

Figure 4:
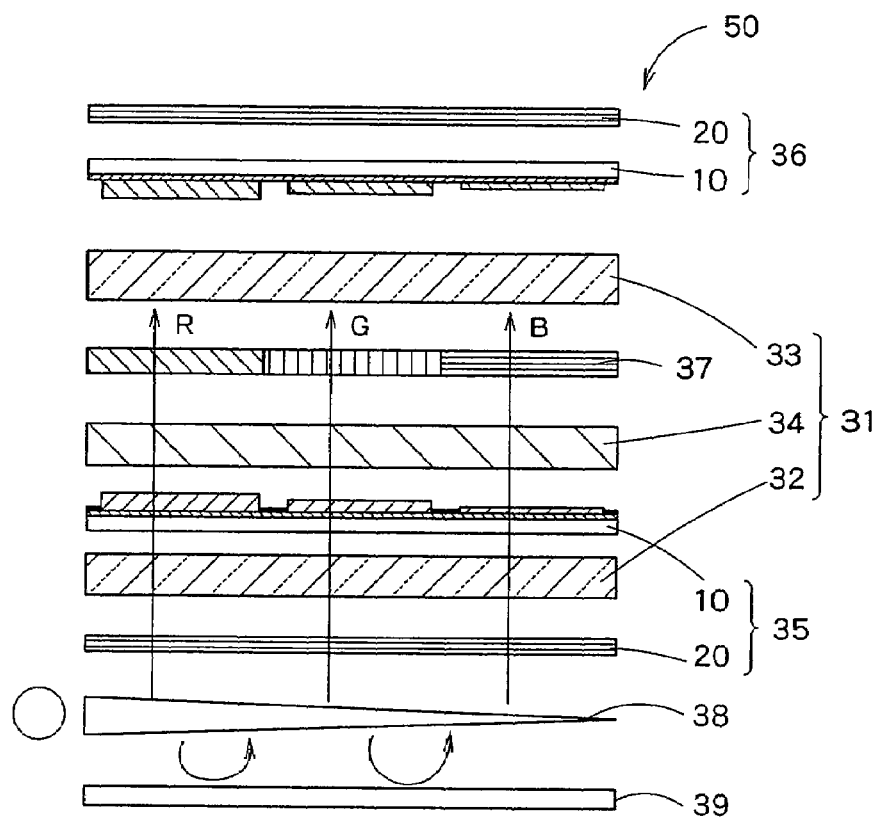
FIG. 4 is a diagrammatic sectional view showing an embodiment of a liquid crystal display element into which the retardation element shown in FIG. 1 is incorporated.

The retardation film 10 shown in FIG. 1 is for use, as shown in FIG. 4, in a liquid crystal display element 50 having pixels, each pixel being a triad of red, green and blue display sections. The liquid crystal layer 14 in the retardation film 10 has a plurality of fine areas 14a, 14b and 14c that have been created, by patterning, correspondingly to the display sections of the pixels in the three colors.

Figure 5:
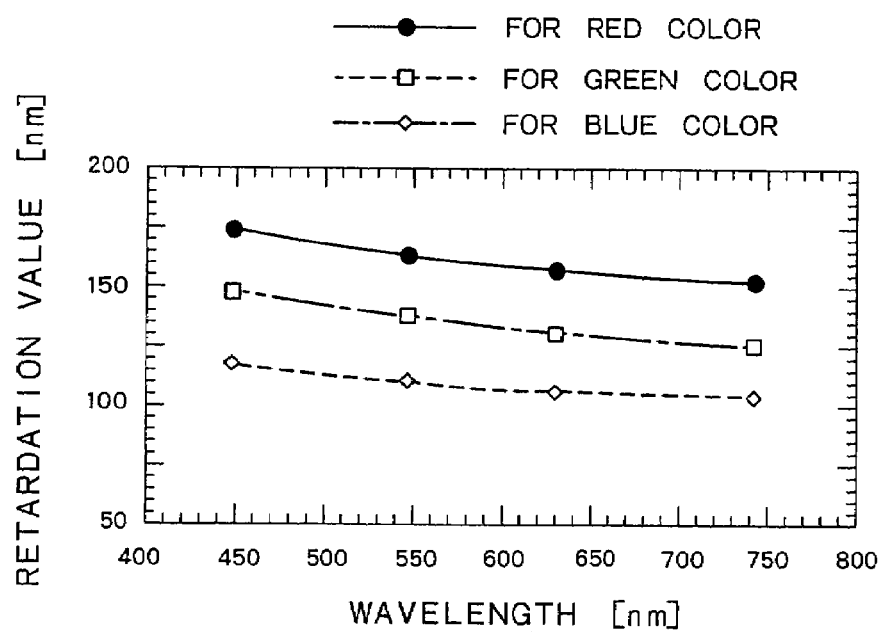
FIG. 5 shows the retardation values of the fine areas (for red, green and blue colors) in the liquid crystal layer of the retardation element shown in FIG. 1.

The fine areas 14a, 14b and 14c are for red, green and blue colors, respectively, and, as shown in FIG. 5, have different retardation values for red, green and blue light that pass through the fine areas.

For example, in the case where this retardation film is used for a circular polarizer for use in a reflection liquid crystal display, it is preferable that its retardation value for light of each color be $\lambda/4$ at an optimum wavelength of the light.

Specifically, it is preferable that the fine areas for blue color have a retardation value of 100 to 125 nm. Further, in the case where the retardation film is used along with an absorption color filter, the wavelength of light is preferably in the proximity of, more preferably equal to, the wavelength at which the transmittance of the color filter to be used peaks in the spectrum shown in FIG. 6.

It is preferable that the fine areas for green color have a retardation value of 125 to 145 nm. Further, in the case where the retardation film is used together with an absorption color filter, the wavelength of light is preferably in the proximity of, more preferably equal to, the wavelength at which the transmittance of the color filter to be used peaks in the spectrum shown in FIG. 6.

Figure 6:
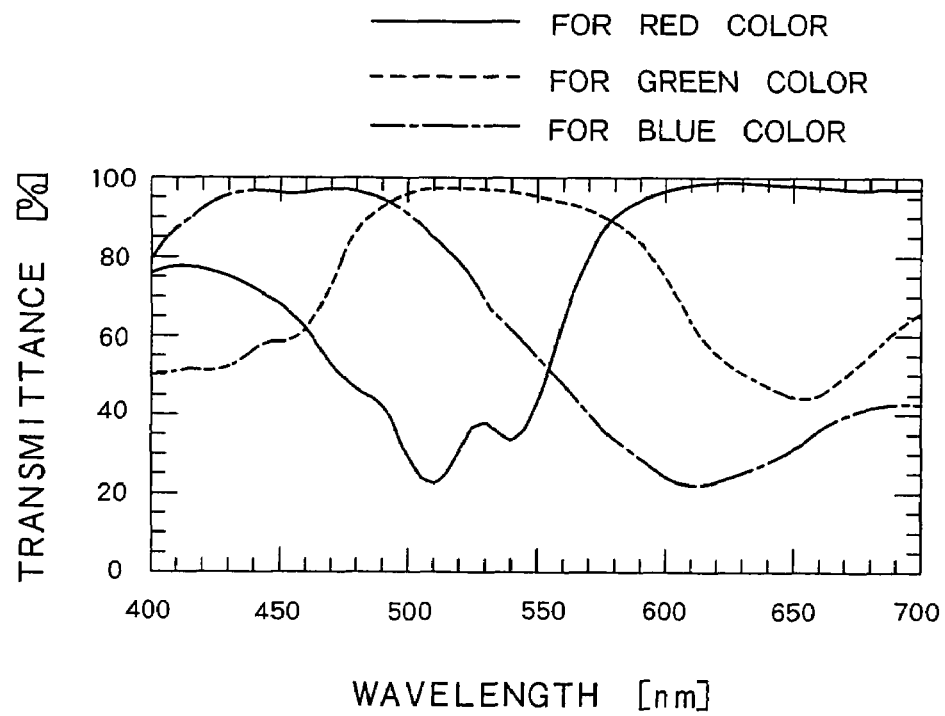
FIG. 6 shows the transmittance spectra of a color filter for use in a reflection liquid crystal display.
Figure 7:
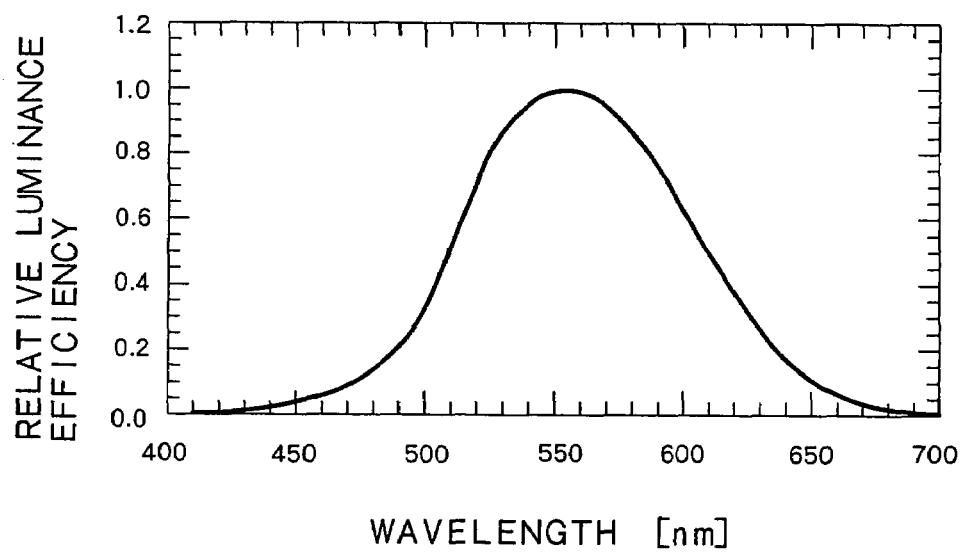
FIG. 7 shows a relative luminous efficiency curve.

It is preferable that the fine areas for red color have a retardation value of 145 to 175 nm. When the retardation film is used together with an absorption color filter, the wavelength dispersion of the transmittance of the color filter to be used is relatively flat as shown in FIG. 6. Therefore, the wavelength of light is preferably in a range of 580 to 650 nm in which the coefficient of the relative luminous efficiency curve shown in FIG. 7 is relatively great. In this case, the retardation value is preferably from 145 to 163 nm.

In a liquid crystal display element 50 shown in FIG. 4, the retardation film 10 shown in FIG. 1 is used as a constituent part of absorption circular polarizers 35 and 36. Namely, as shown in FIGS. 1 and 4, the retardation film 10 is used in combination with a linear polarizer 20 to constitute the absorption circular polarizer, which converts unpolarized light into circularly polarized light as the light passes through it. The retardation film 10 to be used for the absorption circular polarizer 35 is provided with a black matrix between the fine areas.

With reference to FIG. 4, the liquid crystal display element 50 into which the retardation film 10 of the above-described construction is incorporated will be outlined below.

As shown in FIG. 4, the liquid crystal display element 50 comprises a liquid crystal cell 31, and a pair of absorption circular polarizers 35 and 36 that are respectively placed on the light source side and the viewer's side so that they sandwich the liquid crystal cell 31. In this liquid crystal display element 50, the absorption circular polarizer 35 converts light (unpolarized light) that is projected from a light source 38 and a reflector 39 into circularly polarized light, which is then allowed to enter the liquid crystal cell 31.

The liquid crystal cell 31 controls, by changing the direction of rotation of the circularly polarized light that passes through it, the switching between the bright and dark states of light emerging from the absorption circular polarizer 36 placed on the viewer's side. The liquid crystal cell 31 contains a pair of opposed substrates 32 and 33 and a liquid crystal 34 placed between them, and an absorption color filter 37 is interposed between the substrates 32 and 33. The absorption color filter 37 has fine patterns in red, green and blue colors that serve as the display sections in the three colors of red, green and blue, respectively, so that light passing through these fine patterns becomes red, green and blue light. There are thus realized pixels, each pixel being a triad of red, green and blue display sections. Instead of the absorption color filter 37, it is possible to use a color filter of any type, such as a reflection color filter or a combination of an absorption color filter and a reflection color filter. Moreover, the absorption color filter 37 may be placed in any position inside the liquid crystal display element 50.

Figure 2:
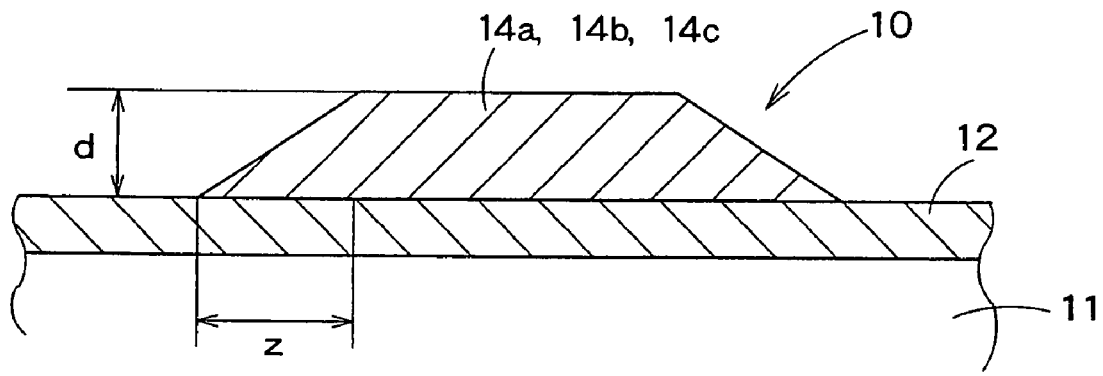
FIG. 2 is a fragmentary sectional view showing the details of the liquid crystal layer in the retardation element shown in FIG. 1.

Returning now to FIG. 1, the fine areas 14a, 14b and 14c in the liquid crystal layer 14 are made from one liquid crystalline material (a nematic liquid crystalline material, a cholesteric liquid crystalline material, or a combination of one or more of these liquid crystalline materials), and have different film thicknesses so that they have different retardation values depending upon the wave range of light that passes through them. As shown in FIG. 2, the rising distance z at the end of each fine area 14a, 14b or 14c in the liquid crystal layer 14 (the horizontal distance between the point at which the film thickness is zero and the point at which the film thickness reaches the maximum d for the first time) is preferably not more than 10 µm. As long as the rising distance z is made in this range, the line width of a black matrix that is provided between the fine areas 14a, 14b and 14c can be made small. As a result, a high aperture ratio is attained, and high definition displaying can be achieved.

A nematic liquid crystal having polymerizable groups may be used as the liquid crystalline material for forming the liquid crystal layer 14. Specifically, for example, it is preferable to use, as a nematic liquid crystal, either one of, or two or more, as needed, of those compounds represented by the following chemical formulae (1) to (10).

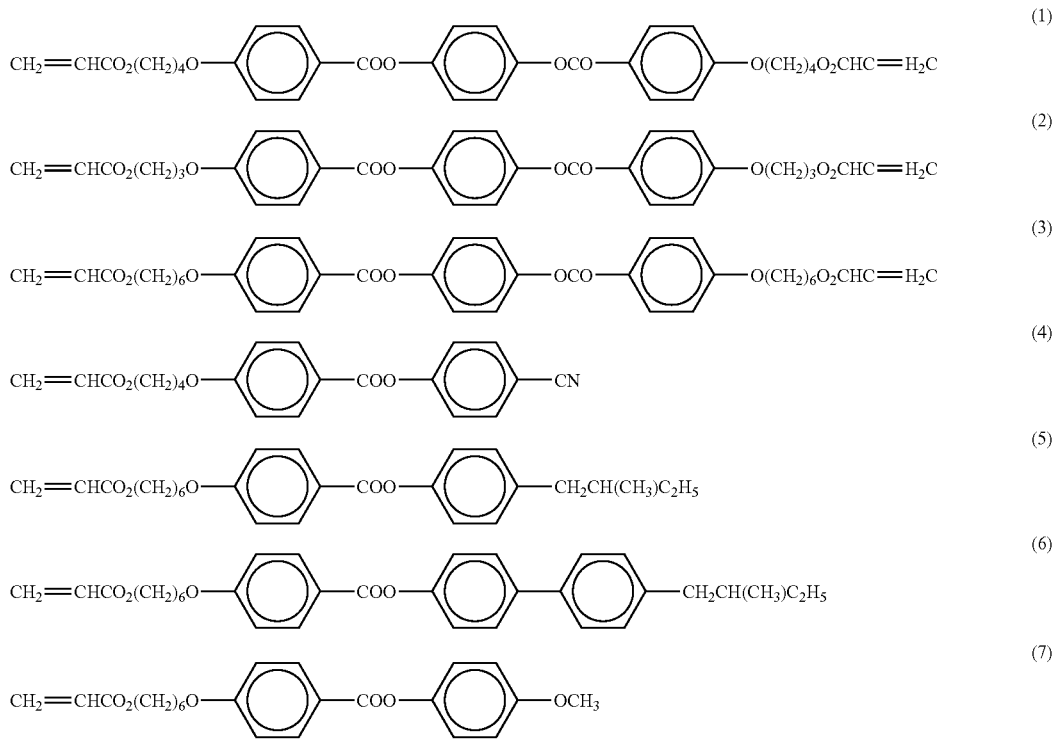

-continued

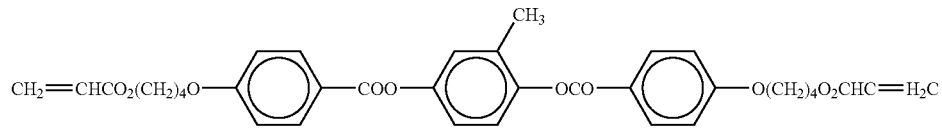
(8)

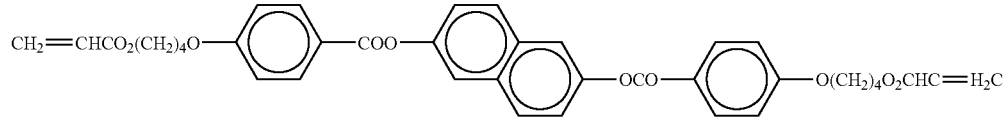
(9)

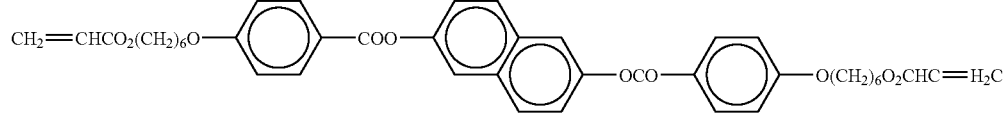
(10)

Any liquid crystalline material can be used for forming the liquid crystal layer 14 as long as it has the function of bringing about a phase difference to light incident on it at a certain incident angle, and not only the above-described nematic liquid crystals but also other liquid crystalline materials such as chiral nematic liquid crystals (liquid crystals prepared by adding chiral agents to nematic liquid crystals) may be used freely. In the case of such chiral nematic liquid crystals, it is preferable that the nematic liquid crystals have polymerizable groups and that the chiral agents also have polymerizable groups.

To obtain a chiral nematic liquid crystal, it is preferable to use, as the nematic liquid crystal, either one of, or two or more, as needed, of the compounds represented by the above chemical formulae (1) to (10), and, as the chiral agent, the compound represented by the following chemical formula (11), (12) or (13), S-811 (a chiral dopant liquid crystal manufactured by Merck KGaA, German), or the like.

Next, a process of producing the retardation film 10 of the above-described construction will be described with reference to FIG. 3.

A glass substrate 11 on which an alignment layer 12 is formed is firstly prepared as the substrate having aligning power. A liquid crystal layer 13 is formed by a polymerizable liquid crystalline material on the alignment layer 12 that has been formed on top of the glass substrate 11, and is subjected, as needed, to heat treatment with the aligning power of the alignment layer 12 being affected, thereby aligning liquid crystalline molecules in the liquid crystal layer 13 (FIG. 3(*a*)). For the alignment layer 12, polyimide, polyamide, polyvinyl alcohol, or the like is usually used, and aligning power is imparted to the alignment layer 12 by rubbing. The following method is usually adopted as a method of rubbing the alignment layer 12: a rubbing cloth of a material selected from rayon, cotton, polyamide and so forth is wound around a metallic roll; and the alignment layer 12 formed on the glass (11)

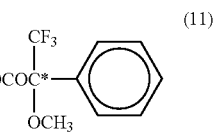

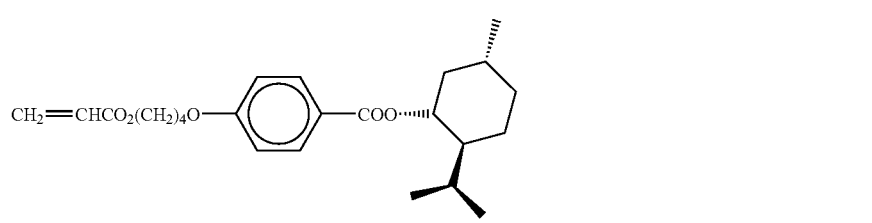
(12)

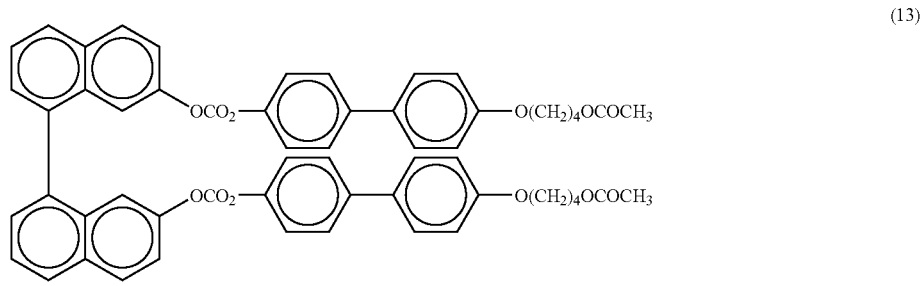
(13)

substrate 11 is kept in contact with the metallic roll while rotating the metallic roll, or the glass substrate 11 provided with the alignment layer 12 is moved on the stationary metallic roll, thereby rubbing the alignment layer 12 with the rubbing cloth.

Thereafter, radiation 41 is applied to the liquid crystal layer 13 on the alignment layer 12 that has been formed on top of the glass substrate 11, thereby three-dimensionally cross-linking and curing the liquid crystal layer 13 (FIG. 3 (b)). In this process, the quantity of the radiation 41 that is applied to the liquid crystal layer 13 is, as shown in FIG. 3(b), varied according to the group of fine areas to be created in the liquid crystal layer 13 correspondingly to the display sections of the pixels in one of the three colors. The radiation 41 is for causing photopolymerization reaction or the like in a radiation-polymerizable liquid crystalline material. Ultraviolet light, electron beams, visible light, infrared light (heat rays), or the like can be used as the radiation 41. In the case where the liquid crystal is cured with the use of ultraviolet light, it is preferable to add beforehand a photopolymerization initiator to the liquid crystalline material. Although the quantity of the radiation 41 depends on whether a photopolymerization initiator is present or not, or on the amount of a photopolymerization initiator added, or on the type and illuminance of the radiation to be applied, it is preferably in the order of 1 to 10,000 mJ/cm$^2$, for example. In addition, the radiation 41 is applied to the liquid crystal layer 13 preferably in an atmosphere of an inert gas, such as an atmosphere of nitrogen. If the radiation 41 is applied in such an atmosphere, the liquid crystal layer 13 can be cured without being affected by oxygen and can have stabilized optical properties. Moreover, it is preferable that the atmosphere in which the radiation 41 is applied to the liquid crystal layer 13 be uniformly kept at a temperature higher than room temperature. If the temperature of the atmosphere is so controlled, polymerization of the liquid crystalline material caused by the application of the radiation 41 is accelerated, and the liquid crystal layer 13 can have stabilized optical properties. "Three-dimensional cross-linking" herein means that polymerizable monomers, oligomers or polymers are three-dimensionally polymerized to give a network structure. By bringing to such a state, it is possible to optically fix the state of the liquid crystalline material for the liquid crystal layer 13, and is thus possible to obtain a film that is easy to handle as an optical film and stable at normal temperatures.

A substrate film having aligning power may also be used as the substrate having aligning power. Examples of substrate films useful herein include plastic films of polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resins, polyvinyl alcohol, polypropylene, cellulose, triacetyl cellulose and its partially saponified products, epoxy resins, and phenol resins. A laminate of two or more of these plastic films may also be used as the substrate film. Moreover, these plastic films may be mono- or bi-axially oriented ones. In addition, the substrate film may be subjected beforehand to surface treatment such as treatment for making its surface hydrophilic or hydrophobic. Although it is not necessary to separately impart aligning power to the substrate film depending on the composition of the liquid crystal contained in the solution, it is preferable to impart aligning power to the substrate film prior to the application of the solution. To impart aligning power to the substrate film, an alignment layer is laminated to the substrate film, or the substrate film or an alignment layer formed on the substrate film is rubbed. It is also possible to impart aligning power to the substrate film by depositing silicon oxide on the substrate film by means of oblique evaporation. The details of the alignment layer and those of the method of rubbing are as mentioned previously.

Depending, for example, on the composition of the liquid crystal contained in the solution, it is also possible to use, as the substrate having aligning power, a glass substrate or the like that is provided with no alignment layer or has not been rubbed.

Thereafter, the liquid crystal layer 13 irradiated with the radiation 41 is brought into contact with an organic solvent 42 (FIG. 3(c)). To bring the liquid crystal layer 13 into contact with an organic solvent 42, it is possible to employ various methods of development such as dipping and spin shower, as well as various methods of coating such as spin coating, die coating and cast coating. In this step, the uncured component contained in the liquid crystal layer 13 is developed. There is thus obtained a liquid crystal layer 14 having fine areas 14a, 14b and 14c that correspond to the display sections of the pixels in the three colors of red, green and blue, respectively. The liquid crystal layer 13 to which the radiation 41 has been applied in the step shown in FIG. 3(b) contains a larger amount of the uncured component when the quantity of the radiation 41 applied is smaller and contains a smaller amount of the uncured component when the quantity of the radiation 41 applied is greater. That is to say, when a smaller quantity of the radiation 41 is applied, the thicknesses of the resulting fine areas 14a, 14b and 14c in the developed liquid crystal layer 14 become smaller, while when a larger quantity of the radiation 41 is applied, the thicknesses of these fine areas become greater. Therefore, by varying the quantity of the radiation 41 that is applied to the liquid crystal layer 13 according to the group of fine areas to be created in the liquid crystal layer 13 correspondingly to the display sections of the pixels in one of the three colors, it is possible to control the thicknesses of the fine areas 14a, 14b and 14c in the developed liquid crystal layer 14. In this process, the thicknesses of the fine areas 14a, 14b and 14c in the liquid crystal layer 14 are controlled in consideration of the wavelength dispersion of refractive index of the liquid crystalline material, or the like, so that the fine areas have different retardation values for red, green and blue light that pass through them.

Any organic solvent can be used as the organic solvent 42 as long as it can dissolve the liquid crystal layer 13. Specifically, one of, or two or more of the following solvents may be used: hydrocarbons such as benzene, toluene, xylene, n-butylbenzene, diethylbenzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentanedione; esters such as ethyl acetate, ethylene glycol monomethyl ether acetate, propylene glycol monomethyl ether acetate, propylene glycol monoethyl ether acetate and γ-butyrolactone; amides such as 2-pyrrolidone, N-methyl-2-pyrrolidone, dimethylformamide and dimethylacetamide; halogen-containing solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethylene glycol, hexylene glycol, ethylene glycol monomethyl ether, ethyl cellosolve and butyl cellosolve; and phenols such as phenol and parachlorophenol. Even if the liquid crystal cannot fully be dissolved or the substrate film is likely to be eroded when solvents of one type are used, these inconveniences can be avoided if a mixture of solvents of two or more types is used. Of the above-enumerated solvents, hydrocarbons and glycol monoether acetates are preferred for single use, and mixtures of ethers or ketones and glycols are preferred solvent mixtures. Although the concentration of the solution cannot be defined sweepingly because it depends on the solubility of the liquid crystal or on the thickness of the liquid crystal layer to be formed, it is made usually between 1% and 60% by weight, preferably between 3% and 40% by weight. To the liquid crystal solution, surface-active agents or the like may be added for easier application. Examples of surface-active agents that can be added to the liquid crystal solution include cationic surface-active agents such as imidazoline, quaternary ammonium salts, alkylamine oxides, and polyamine derivatives; anionic surface-active agents such as polyoxyethylene-polyoxypropylene condensates, primary or secondary alcohol ethoxylates, alkylphenol ethoxylates, polyethylene glycol and esters thereof, sodium lauryl sulfate, ammonium lauryl sulfate, amine lauryl sulfates, alkyl-substituted aromatic sulfonates, alkyl phosphates, and aliphatic or aromatic sulfonic acid-formalin condensates; ampholytic surface-active agents such as laurylamide propylbetaine, and lauryl aminoacetate betaine; nonionic surface-active agents such as polyethylene glycol fatty esters, and polyoxyethylene alkylamines; and fluorine-containing surface-active agents such as perfluoroalkyl sulfonates, perfluoroalkyl carbonates, perfluoroalkyl ethylene oxide adducts, perfluoroalkyl trimethyl ammonium salts, oligomers containing perfluoroalkyl groups and hydrophilic groups, oligomers containing perfluoroalkyl groups and lipophilic groups, and urethanes containing perfluoroalkyl groups. Although the amount of the surface-active agent to be added depends on the type of the surface-active agent, on that of the curable liquid crystal, on that of the solvent, and on that of the glass substrate or substrate film to which the solution is applied, it is usually from 10 ppm by weight to 10% by weight, preferably from 100 ppm by weight to 5% by weight, more preferably from 0.1 to 1% by weight, of the liquid crystal contained in the solution.

Lastly, by heating to a predetermined temperature, the liquid crystal layer 14 that has been brought into contact with the organic solvent 42 in the above-described manner is dried, and the dried liquid crystal layer 14 is then cured again by the application of radiation 43 in order to stabilize its optical properties (FIG. 3(d)). In this step, as with the above-described radiation 41, ultraviolet light, electron beams, visible light, infrared light (heat rays), or the like can be used as the radiation 43 that is applied to the liquid crystal layer 14. Although the quantity of the radiation 43 depends on whether a photopolymerization initiator is present or not, on the amount of a photopolymerization initiator added, or on the type of the radiation to be applied, it is preferably in the order of 1 to 10,000 mJ/cm$^2$, for example. Further, it is preferable that the radiation 43 be applied to the liquid crystal layer 14 in an atmosphere of an inert gas, such as an atmosphere of nitrogen. By applying the radiation 43 in such an atmosphere, it is possible to cure the liquid crystal layer 14 without influence of oxygen and stabilize its optical properties. Moreover, it is preferable that the atmosphere in which the radiation 43 is applied to the liquid crystal layer 14 be uniformly kept at a temperature higher than room temperature. By so controlling the temperature of the atmosphere, it is possible to accelerate the polymerization of the liquid crystalline material that is caused by the application of the radiation 43 and stabilize the optical properties of the liquid crystal layer 14. The liquid crystal layer 14 that has been cured again by the application of the radiation 43 may further be heated at a high temperature for thermal curing. By thermally curing the liquid crystal layer 14, it is possible to further stabilize its optical properties.

Thus, there is finally obtained a retardation film 10 comprising the liquid crystal layer 14 with the fine areas 14a, 14b and 14c that correspond to the display sections of the pixels in the three colors of red, green and blue, respectively (FIG. 3(e)).

In the above-described production process, a coating liquid prepared by dissolving, in a solvent, the liquid crystalline material for the liquid crystal layer 13 may be used to form the liquid crystal layer 13. In this case, it is necessary to effect the drying step of evaporating the solvent before three-dimensionally cross-linking the liquid crystal layer by the application of the radiation 41.

According to this embodiment, the liquid crystal layer 14 constituting the retardation film 10 has the fine areas 14a, 14b and 14c that have been created, by patterning, correspondingly to the display sections of the pixels in the three colors of red, green and blue, respectively, and these fine areas 14a, 14b and 14c are made to have different retardation values depending upon the wave range of light that passes through them, so that light passing through the display sections of the pixels in the three colors undergoes no scatter in the state of polarization. For this reason, even when the retardation film 10 is incorporated into a liquid crystal display element 50 (a display element having pixels, each pixel being a triad of red, green and blue display sections) as shown in FIG. 4, the display element 50 can show excellent display characteristics.

Further, according to this embodiment, after making, by the application of the radiation 41, semi-cured and uncured areas in the liquid crystal layer 13 on the alignment layer 12 that has been formed on top of the glass substrate 11, the liquid crystal layer 13 is brought into contact with the organic solvent 42 so that it has different thicknesses depending upon the degree of cure. It is therefore possible to easily control the thicknesses of the fine areas 14a, 14b and 14c in the developed liquid crystal layer 14 by varying the quantity of the radiation 41 that is applied to the liquid crystal layer 13. The retardation values of the fine areas 14a, 14b and 14c in the liquid crystal layer 14 can thus be controlled with high accuracy and ease.

In the retardation film 10 according to the aforementioned embodiment, the fine areas 14a, 14b and 14c in the liquid crystal layer 14 are made from one liquid crystalline material, and their retardation values are controlled by variation of their thicknesses. The present invention is not limited to this, and the retardation values of the fine areas 14a, 14b and 14c in the liquid crystal layer 14 may be controlled by making these fine areas from different liquid crystalline materials. In this case, the fine areas 14a, 14b and 14c are created in the liquid crystal layer 14 by a patterning that is conducted photolithographically or by any of various printing methods.

Furthermore, the retardation film 10 according to the aforementioned embodiment comprises the single liquid crystal layer 14. The present invention is not limited to this, and the retardation film 10 may comprise two or more liquid crystal layers that are laminated to each other. To obtain a laminate of liquid crystal layers, an upper liquid crystal layer may be laminated to a lower liquid crystal layer directly or with an alignment layer or the like interposed between them. In the latter case, if an alignment layer rubbed in a direction different from the direction in which the alignment layer formed on the substrate has been rubbed is provided between the two liquid crystal layers that constitute the liquid crystal layer 14, there can be obtained a laminate of two or more nematic liquid crystal layers in which their axes of phase delay are in different directions.

The above embodiment has been described by referring to the case where the retardation film 10 is incorporated into the liquid crystal display element 50. The present invention is not limited to this, and, as shown in FIG. 8, the retardation film 10 may also be incorporated into an organic electroluminescent display element 60 having pixels, each pixel being a triad of red, green and blue display sections. In this case, the retardation film 10 is used in combination with a linear polarizer 20 to constitute an absorption circular polarizer 36, which converts unpolarized light into circularly polarized light as the light passes through it. On the retardation film 10, a black matrix is provided between the fine areas.

As shown in FIG. 8, the organic electroluminescent display element 60 comprises a white electroluminescent element 61 having the function of individually controlling each pixel, a triad of red, green and blue display sections, to the bright or dark state. The white electroluminescent element 61 contains a white-light-emitting element 64 sandwiched between two opposed electrodes, a metallic electrode 62 and a transparent electrode 63.

The organic electroluminescent display element 60 also contains an absorption color filter 37 placed on the viewer's side of the white electroluminescent element 61 and an absorption circular polarizer 36 placed on the viewer's side of the absorption color filter 37.

The absorption color filter 37 has fine patterns in red, green and blue colors that serve as the red, green and blue display sections, respectively. After light projected from the white electroluminescent element 61 has passed through the fine patterns of the absorption color filter 37, it enters the absorption circular polarizer 36 having the retardation film 10. It is herein possible to use, instead of the absorption color filter 37, a color filter of any type, such as a reflection color filter or a combination of an absorption color filter and a reflection color filter. Moreover, the absorption color filter 37 may be placed in any position inside the organic electroluminescent display element 60.

Furthermore, the retardation film 10 may also be incorporated, as shown in FIG. 9, into an organic electroluminescent display element 60' having pixels, each pixel being a triad of red, green and blue display sections. In this case, a black matrix is provided on the retardation film 10 between the fine areas. The organic electroluminescent display element 60' shown in FIG. 9 uses a patterned RGB phosphor type electroluminescent element 61' instead of the white electroluminescent element 61 shown in FIG. 8. Light projected from the patterned RGB phosphor type electroluminescent element 61' directly enters an absorption circular polarizer 36 having the retardation film 10 without passing through a color filter or the like. The patterned RGB phosphor type electroluminescent element 61' is composed of a red-light-emitting element 65a, a green-light-emitting element 65b and a blue-light-emitting element 65c that are sandwiched between two opposed electrodes, a metallic electrode 62 and a transparent electrode 63, and that serve as the red, green and blue display sections, respectively.

EXAMPLES

The present invention will now be described more specifically by referring to the following Examples.

Example 1

A photo-curing nematic liquid crystal solution consisting of a polymerizable nematic liquid crystal (25 parts by weight), a photopolymerization initiator (1 part by weight) and toluene (74 parts by weight) was prepared.

In the above preparation, the compound represented by the above chemical formula (8) was used as the nematic liquid crystal, and Irg 631 (available from Ciba Specialty Chemicals K.K., Japan), as the photopolymerization initiator.

On the other hand, a substrate having aligning power was prepared by applying polyimide (PI) to a glass substrate and rubbing the polyimide film in one direction (alignment layer treatment).

The glass substrate provided with the polyimide (PI) film that had been rubbed was set in a spin coater and was spin-coated with the above-prepared photo-curing nematic liquid crystal solution at a dry thickness in the order of 0.10 to 7.00 μm.

By heating at 80° C. for 5 minutes, this liquid crystal layer was dried and aligned. It was visually confirmed that the layer thus formed on the alignment layer had a liquid crystal phase (nematic phase).

Ultraviolet light was then applied to this liquid crystal layer by the use of an ultraviolet irradiation system using an extra-high pressure mercury vapor lamp, thereby three-dimensionally cross-linking and polymerizing the liquid crystal layer. In this process, the quantity of ultraviolet light that was applied to the liquid crystal layer was varied (10 mJ/cm$^2$, 20 mJ/cm$^2$, and 100 mJ/cm$^2$) according to the group of fine areas to be created in the liquid crystal layer correspondingly to the display sections of pixels in one of three colors of red, green and blue.

Thereafter, the liquid crystal layer irradiated with ultraviolet light was immersed in acetone for 5 minutes.

After drying the liquid crystal layer at 60° C. for 15 minutes, 500 mJ/cm$^2$ of ultraviolet light was applied to the dried liquid crystal layer by the use of an ultraviolet irradiation system using an extra-high pressure mercury vapor lamp. Thus, the nematic layer was cured again, and its optical properties were stabilized.

By thermally curing the nematic layer for 1 hour in an oven (200° C.), its optical properties were further stabilized.

Thus, there was finally obtained a retardation film having the patterned liquid crystal layer.

The thicknesses of the fine areas in the liquid crystal layer of the retardation film thus produced were measured. As a result, they were found to be 0.88 μm, 1.01 μm and 1.25 μm that corresponded to the quantities of ultraviolet light applied, 10 mJ/cm$^2$, 20 mJ/cm$^2$ and 100 mJ/cm$^2$, respectively.

Example 2

A photo-curing chiral nematic liquid crystal solution consisting of a polymerizable nematic liquid crystal (20 parts by weight), a chiral agent (2 parts by weight), a photopolymerization initiator (1 part by weight) and toluene (77 parts by weight) was prepared.

In the above preparation, the compound represented by the above chemical formula (8) was used as the nematic liquid crystal, S-811 (a chiral dopant liquid crystal manufactured by Merck KGaA, German), as the chiral agent, and Irg 631 (available from Ciba Specialty Chemicals K.K., Japan), as the photopolymerization initiator.

On the other hand, a substrate having aligning power was prepared by applying polyimide (PI) to a glass substrate and rubbing the polyimide film in one direction (alignment layer treatment).

The glass substrate provided with the polyimide (PI) film that had been rubbed was set in a spin coater and was spin-coated with the above prepared photo-curing chiral nematic liquid crystal solution at a dry thickness in the order of 3.0 to 7.0 μm.

By heating at 80° C. for 5 minutes, this liquid crystal layer was dried and aligned. It was visually confirmed that the layer thus formed on the alignment layer had a liquid crystal phase (cholesteric phase).

Ultraviolet light was then applied to this liquid crystal layer by the use of an ultraviolet irradiation system using an extra-high pressure mercury vapor lamp, thereby three-dimensionally cross-linking and polymerizing the liquid crystal layer. In this process, the quantity of ultraviolet light that was applied to the liquid crystal layer was varied (10 mJ/cm$^2$, 20 mJ/cm$^2$, and 180 mJ/cm$^2$) according to the group of fine areas to be created in the liquid crystal layer correspondingly to the display sections of pixels in one of three colors of red, green and blue Thereafter, the liquid crystal layer irradiated with ultraviolet light was immersed in acetone for 5 minutes.

After drying the liquid crystal layer at 60° C. for 15 minutes, 500 mJ/cm$^2$ of ultraviolet light was applied to the dried liquid crystal layer by the use of an ultraviolet irradiation system using an extra-high pressure mercury vapor lamp. Thus, the cholesteric layer was cured again, and its optical properties were stabilized.

By thermally curing the cholesteric layer for 1 hour in an oven (200° C.), its optical properties were further stabilized.

Thus, there was finally obtained a retardation film having the patterned liquid crystal layer.

The thicknesses of the fine areas in the liquid crystal layer of the retardation film thus produced were measured. As a result, they were found to be 3.02 μm, 3.52 μm and 3.89 μm that corresponded to the quantities of ultraviolet light applied, 10 mJ/cm$^2$, 20 mJ/cm$^2$ and 180 mJ/cm$^2$, respectively.

What is claimed is:

1. A retardation element for use in a display element having pixels, each of the pixels being a triad of red, green and blue display sections, comprising:
    a substrate having aligning power; and
    a liquid crystal layer consisting essentially of one or more polymerizable liquid crystalline materials three dimensionally polymerized in a network structure, formed on the substrate,
    wherein the liquid crystal layer has a plurality of fine areas, the fine areas being created, by patterning, correspondingly to the display sections of the pixels in the three colors, and the fine areas having different retardation values for red, green and blue light that pass through the fine areas.

2. The retardation element according to claim 1, wherein the liquid crystal layer comprises one selected from a group of a nematic liquid crystalline material, a cholesteric liquid crystalline material, and a combination of one or more of these liquid crystalline materials.

3. The retardation element according to claim 1, wherein the fine areas in the liquid crystal layer have different film thicknesses so that they have different retardation values depending upon wave range of light that passes through them.

4. The retardation element according to claim 1, wherein the fine areas in the liquid crystal layer are made from different liquid crystalline materials so that they have different retardation values depending upon wave range of light that passes through them.

5. The retardation element according to claim 1, wherein the rising distance z at an end of each fine area in the liquid crystal layer is not more than 10 μm.

6. The retardation element according to claim 1, wherein the liquid crystal layer is a laminate of two or more liquid crystal layers.

7. The retardation element according to claim 1, wherein the substrate is a transparent substrate.

8. A display element having pixels, each of the pixels being a triad of red, green and blue display sections, comprising:
    a light-emitting component having a function of individually controlling each of the pixels, which is a triad of red, green and blue display sections, to bright or dark state; and
    a retardation element for use with the light-emitting component, the retardation element comprising a substrate having aligning power, and a liquid crystal layer consisting essentially of one or more polymerizable liquid crystalline materials three dimensionally polymerized in a network structure, formed on the substrate,
    wherein the liquid crystal layer has a plurality of fine areas, the fine areas being created, by patterning, correspondingly to the display sections of the pixels, in the three colors, and the fine areas having different retardation values for red, green and blue light that pass through the fine areas.

9. The display element according to claim 8, wherein the light-emitting component comprises: a liquid crystal cell having a function of individually controlling each of the pixels, which is a triad of red, green and blue display sections, to the bright or dark state; and a color filter having fine patterns in three colors of red, green and blue that serve as the display sections in the three colors of red, green and blue, respectively, and the retardation element is used together with the liquid crystal cell and the color filter.

10. The display element according to claim 8, wherein the light-emitting component comprises: a white electroluminescent element having a function of individually controlling each of the pixels, which is a triad of red, green and blue display sections, to the bright or dark state; and a color filter having fine patterns in three colors of red, green and blue that serve as the display sections in the three colors of red, green and blue, respectively, and the retardation element is used together with the white electroluminescent element and the color filter.

11. The display element according to claim 8, wherein the light-emitting component comprises: an electroluminescent element having a function of individually controlling each of the pixels, which is a triad of red, green and blue display sections, to the bright or dark state, the electroluminescent element comprising red-, green- and blue-light-emitting elements that serve as the display sections in the three colors of red, green and blue, respectively, and the retardation element is used together with the electroluminescent element.

* * * * *